United States Patent [19]

Szejtli et al.

[11] 4,357,468
[45] Nov. 2, 1982

[54] SORBENTS OF CELLULOSE BASIS CAPABLE OF FORMING INCLUSION COMPLEXES AND A PROCESS FOR THE PREPARATION THEREOF

[75] Inventors: József Szejtli; Béla Zsadon; Éva Fenyvesi; nee Otta Horvath; Ferenc Tüdős, all of Budapest, Hungary

[73] Assignee: Chinoin Gyogyszer es Vegyeszeti Termekek Gyara Rt., Budapest, Hungary

[21] Appl. No.: 288,764

[22] Filed: Jul. 31, 1981

[30] Foreign Application Priority Data

Aug. 7, 1980 [HU] Hungary ............................. 1960/80

[51] Int. Cl.³ ........................ C08B 15/00; C08B 37/16
[52] U.S. Cl. ................................. 536/56; 106/163 R; 106/164; 106/170; 106/210; 106/213; 536/57; 536/58; 536/103
[58] Field of Search ..................... 536/56, 57, 103, 58; 106/210, 213, 163 R, 164, 170

[56] References Cited

U.S. PATENT DOCUMENTS 3,420,788  1/1969  Solms .................................. 260/17.4
3,426,011  2/1969  Parmerter et al. ................. 536/103
4,228,160 10/1980  Szejtli et al. ........................ 536/103

FOREIGN PATENT DOCUMENTS 2037306  7/1980  United Kingdom .
2061987  5/1981  United Kingdom .

Primary Examiner—Ronald W. Griffin
Attorney, Agent, or Firm—Karl F. Ross

[57] ABSTRACT

The invention relates to new sorbents of cellulose basis capable of forming inclusion complexes, as well as to a process for the preparation thereof. The new sorbents according to the invention are cellulose derivatives containing structural units of the general formula (I),

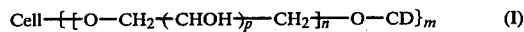

(I)

wherein
Cell is a group derived by removing m hydroxy groups from the glucose unit of the cellulose chain,
m is an integer of 1 to 3,
CD is a group derived by removing one hydroxy group from the $\alpha$, $\beta$ or $\gamma$-cyclodextrin molecule,
n is an integer of 1 to 5, and
p stands for 0 or 1, which may optionally vary even within a single chain.

The cellulose derivatives according to the invention are substances of loose structure, with large specific surface area and good swelling properties, which can be applied for solving the most diverse adsorption tasks. Thus e.g. the substances can be applied for the preparation of smoke filters in cigarettes, waste water purification (de-poisoning) filters, inserts for removing solvent vapors, etc., furthermore for solving specific tasks of fractionation according to molecular dimensions.

15 Claims, No Drawings

SORBENTS OF CELLULOSE BASIS CAPABLE OF FORMING INCLUSION COMPLEXES AND A PROCESS FOR THE PREPARATION THEREOF

The invention relates to cellulose base sorbents capable of forming inclusion complexes, as well as to a process for the preparation thereof. The new sorbents according to the invention are cellulose derivatives with structural units of the formula (I),

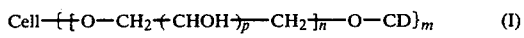

wherein
- Cell is a group derived by removing m hydroxy groups from the glucose unit of a cellulose chain,
- m is an integer of 1 to 3,
- CD is a group derived by removing one hydroxy group from an α, β or γ-cydodextrin molecule,
- n is an integer of 1 to 5, and
- p stands for 0 or 1, which may optionally vary even within a single chain.

It is known that cyclodextrine, built up from D-glucose molecules by α-1,4-glycoside bonds, may reversibly bind certain compounds from their solutions, gases or vapors. The crown-shaped cyclodextrin molecules may be hydrated very easily on their outer perimeter, whereas primarily hydrophobic molecules are able to be built into their inner non-polar cages. The possibility of inclusion complex formation depends to a great extent on the dimensions of the foreign molecule and those of the internal cage of the cyclodextrin molecule. This latter depends on the number of glucose units which build up the cyclodextrin in question. Thus, using appropriately selected cyclodextrins, certain compounds can be separated as inclusion complexes from mixtures containing them.

It is well known that cellulose and various cellulose-containing composite materials, such as plant fibers, fibrous and filamentary materials, paper, etc., possess adsorption properties which can be utilized for numerous practical purposes.

Owing to the water solubility of cyclodextrins, so far it has not been possible to prepare sorbent fillers or paper-like foils containing active cyclodextrin units in a homogeneous distribution on a carrier with large surface, which can be regenerated arbitrarily many times without any decrease in their activity, and which can be applied in column and layer chromatography and as specific molecular sieves.

Upon examining cellulose and cyclodextrins it has been found that the capacities of cellulose-based adsorbents can be increased considerably and their properties can be modified to advantage upon coupling cyclodextrin molecules to them by chemical bonds, through optionally hydroxy-substituted oxaalkyl chains. This yields a product in which the advantageous properties of cellulose, such as adsorptive capacity, large specific surface area, good swelling, etc., are combined with the ability of cyclodextrins to form inclusion complexes.

These cellulose-derivative-containing structural units of the formula (I) are prepared according to the invention so that (a) one part by weight of cellulose, regenerated cellulose or other cellulose-containing fibrous material pre-swollen in water is reacted with 5 to 30 parts by weight of epichlorohydrin or 1,2-bis(2,3-epoxypropoxy)-ethane in the presence of 10 to 65 parts by weight of water and 1.5 to 5 parts by weight of an alkali metal or alkaline earth metal hydroxide, and the resulting solid product is reacted with 1 to 2 parts by weight of a cyclodextrin in the presence of 1 to 40 parts by weight of an alkali metal or alkaline earth metal hydroxide and 10 to 100 parts by weight of water; or (b) 1 part by weight of cellulose, regenerated cellulose or other cellulose-containing fibrous material pre-swollen in water and 1 to 2 parts by weight of a cyclodextrin are reacted with 15 to 40 parts by weight of epichlorohydrin or 1,2-bis(2,3-epoxypropoxy)-ethane in the presence of 40 to 65 parts by weight of water and 10 to 30 parts by weight of an alkali metal or alkaline earth metal hydroxide.

According to the invention the cyclodextrins are coupled to cellulose by polyfunctional reagents, i.e. epichlorohydrin or diepoxides. Both for the cellulose and the cyclodextrin the alcoholic hydroxy groups participate in the reaction, and they are coupled through ether bonds.

When epichlorohydrin is applied, coupling proceeds in an alkaline medium. First the cellulose is reacted with epichlorohydrin:

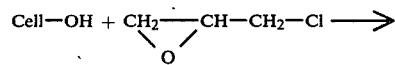

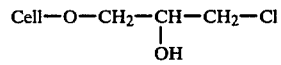

The resulting chlorohydrin converts into an epoxide derivative upon the effect of the concentrated alkali via hydrogen chloride elimination, and this epoxide reacts then with the cyclodextrin:

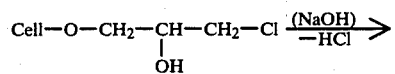

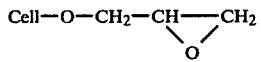

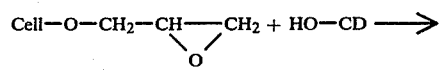

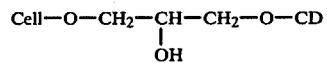

Moreover, the epoxide compound may also react with water, whereupon a substance with a terminal vicinal diol structure is obtained. This compound may react again with epichlorohydrin, with the formation of longer chains between the cellulose and the cyclodextrin moieties. As a side reaction, cellulose may also undergo cross-linking.

According to another appropriate solution, 1,2-bis-(2,3-epoxypropoxy)-ethane is used as the coupling reagent. In this instance one of the epoxy groups reacts with the cellulose and the other with the cyclodextrin molecule in alkaline medium:

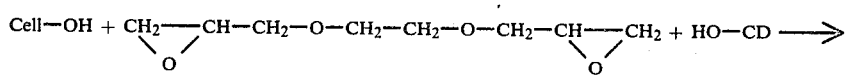

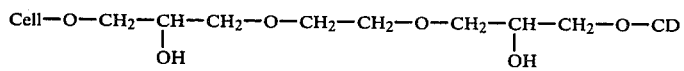

Free side chains with terminal diol groups, or longer side chains and coupling bridges may also form under these conditions.

According to the method of the invention it is preferred first to pre-swell the starting cellulose or cellulose-containing material with an aqueous alkaline solution, and to react it then with epichlorohydrin or 1,2-bis(2,3-epoxypropoxy)-ethane. The first step of coupling is performed preferably in a more dilute alkaline solution (e.g. by introducing 0.4 to 7.2% by volume of a 40% by weight aqueous sodium hydroxide solution into the mixture). It is preferred to use 10 to 55 moles of epichlorohydrin per one glucose unit of the cellulose. After this first step of coupling the epoxide group is formed in the side chain by introducing a more concentrated alkali, such as a 40% by weight aqueous sodium hydroxide solution, and then the cyclodextrin molecule is coupled to the resulting epoxy compound.

$\alpha$, $\beta$ or $\gamma$-cyclodextrin or any mixtures thereof can equally be used in the process of the invention. The choice of the particular cyclodextrin depends on the size of the active cage to be obtained in the product. $\alpha$-Cyclodextrin has cages the smallest in size and $\gamma$-cyclodextrin the largest ones. The size of the cage in $\beta$-cyclodextrin is between the above sizes. The diameters of the cages are 0.6 nm for $\alpha$-cyclodextrin, 0.8 nm for $\beta$-cyclodextrin, and 1.0 nm for $\gamma$-cyclodextrin.

Naturally occurring and synthetic cellulose-containing substances of the widest variety can be used as cellulose-containing fibrous materials in the process of the invention. Of the applicable cellulose-containing fibrous materials, cotton-wool, tissue paper, waddings, oakum, sawdust, wood shavings and wood-flour can be mentioned, but, of course, numerous other cellulosic materials, sometimes even wastes, can be utilized as well. The cellulose-containing starting substance to be applied is selected preferably so that substances with higher degree of purity are utilized for more critical purposes (e.g. to prepare sorbents for chemical or sanitary use), whereas less pure substances are applied for industrial purposes (e.g. for waste water purification).

The progress of the reaction can be accelerated by elevating the temperature. It is not advantageous, however, to increase the temperature of the reaction mixture above 80° C., since the rate of side reactions increases as well. The optimum temperature of the reaction mixture can be provided for by the proper feed rate of the reactants, by appropriately cooling the mixture, or by using a thermostat. The reaction is performed preferably at a temperature not below 40° C.

The cellulose derivatives according to the invention are substances of loose structure, with large specific surface area and good swelling properties, which can be applied for solving the most diverse adsorption tasks. Thus e.g. the substances can be used for the preparation of smoke filters in cigarettes, waste water purification (depoisoning) filters, inserts for removing solvent vapors, etc., furthermore for solving specific tasks of fractionation according to molecular dimensions.

The invention relates further to various sorption elements and sorbents prepared by utilizing cellulose derivatives containing structural units of the general formula (I), wherein Cell, m, CD, n and p are as defined above. These sorbents may have various shapes depending on the manner of utilization. They can be prepared in the form of boards or sheets (such as paper- or felt-like products), they can also be converted, however, into cylinders or tablets. The sheet-shaped sorbents can be applied in particular for various chromatographical purposes, and also as low resistance "molecular sieves" for treating gases or liquids. The cylindrical or tablet-shaped products can be used as smoke filters or smoke filter elements in cigarettes. Another possibility is, particularly when undesired components of liquids are to be removed, to admix a powdery or granular sorbent with the liquid to be purified, and to separate it by filtration after binding the component to be removed. The bound component can be desorbed easily from the sorbent by treating it with steam, thus the sorbent can be reused several times. Ths sorbents are prepared from the cellulose derivatives according to the invention by methods known per se, e.g. by the known technologies of paper industry.

The invention is elucidated in detail by the aid of the following non-limiting Examples.

EXAMPLE 1

10 g of short viscose fibers are swollen in 250 ml of water for one hour, thereafter 300 ml of water, 300 g of epichlorohydrin and 40 ml of a 40% by weight aqueous sodium hydroxide solution are added, and the mixture is stirred for 2.5 hours on a bath heated to 60° C. The mixture is filtered by suction, the filter cake is added to a solution of 11 g of $\beta$-cyclodextrin in 500 ml of a 40% aqueous sodium hydroxide solution, and the mixture is stirred for additional 2.5 hours at 60° C. The mixture is filtered by suction, and the fibrous product is washed with water until free of alkali. The product is suctioned, filtered and then dried at 105° C. for 2 hours. 10.3 g of a white product are obtained with a $\beta$-cyclodextrin content of 48% by weight.

EXAMPLE 2

One proceeds as described in Example 1 with the difference that 10 g of shred tissue paper are applied as starting substance instead of short viscose fibers, 10.2 g of a white, fibrous product are obtained with a $\beta$-cyclodextrin content of 32%.

EXAMPLE 3

One proceeds as described in Example 1 with the difference that 10 g of ground oak bark are applied as starting substance. 8 g of a fibrous product are obtained with a $\beta$-cyclodextrin content of 26%.

EXAMPLE 4

10 g of granular cellulose are pre-swollen in 250 ml of water, and then 300 ml of water, 300 g of 1,2-bis(2,3- epoxypropoxy)-ethane and 40 ml of a 40% by weight aqueous sodium hydroxide solution are added to it. The reaction mixture is stirred for 10 minutes at 60° C., and then 11 g of β-cyclodextrin, dissolved in 700 ml of a 1.7% by weight aqueous sodium hydroxide solution, are introduced. The resulting mixture is stirred at 60° C. for 2.5 hours.

Thereafter the reaction mixture is cooled, the solids are filtered off, washed with water until free of alkali, and dried at 105° C. 12.5 g of a granular product are obtained with a β-cyclodextrin content of 26%.

EXAMPLE 5

One proceeds as described in Example 1 with the difference that α-cyclodextrin is coupled to the viscose. Starting from 10 g of viscose and 11 g of α-cyclodextrin, 10.5 g of a fibrous dry product are obtained with an α-cyclodextrin content of 41%.

EXAMPLE 6

One proceeds as described in Example 1 with the difference that γ-cyclodextrin is coupled to the viscose. Starting from 10 g of viscose and 11 g of γ-cyclodextrin, 10.6 g of a fibrous dry product are obtained with a γ-cyclodextrin content of 50%.

EXAMPLE 7

One proceeds as described in Example 1 with the difference that 1 g of short viscose fiber is swollen in 25 ml of water for one hour, thereafter 30 ml of water, 30 g of epichlorohydrin and 20 ml of a 40% by weighht aqueous sodium hydroxide solution are added, and the mixture is stirred for 2.5 hours on a bath heated to 60° C. The reaction mixture is filtered by suction, and the product is reacted with 1.1 g of β-cyclodextrin as described in Example 1. The dry end product, washed free of alkali, weighs 1 g and contains 9.6% of β-cyclodextrin. The product is of fibrous structure.

EXAMPLE 8

One proceeds as described in Example 1, with the difference that 1 g of short viscose fibers is swollen in 25 ml of water for one hour, thereafter 30 ml of water, 30 g of epichlorohydrin and 1 ml of a 40% by weight aqueous sodium hydroxide solution are added, and the mixture is stirred for 2.5 hours on a bath heated to 60° C. The reaction mixture is filtered by suction, and the product is reacted with 1.1 g of β-cyclodextrin as described in Example 1. The dry end product, washed free of alkali, weighs 1 g and contains 18.7% of β-cyclodextrin. The product is of fibrous structure.

EXAMPLE 9

One proceeds as described in Example 1, with the difference that 1 g of viscose fiber is swollen in 25 ml of water for one hour, thereafter 55 ml of water, 5 g of epichlorohydrin and 4 ml of a 40% by weight aqueous sodium hydroxide solution are added, and the mixture is stirred for 2.5 hours on a bath heated to 60° C. The product is filtered off by suction and then reacted with 1.1 g of β-cyclodextrin as described in Example 1. The dry end product, washed free of alkali, weighs 1 g and contains 29.6% of β-cyclodextrin. The product is of fibrous structure.

EXAMPLE 10

30 g of epichlorohydrin and 1.1 g of β-cyclodextrin, dissolved in 34 ml of a 40% by weight aqueous sodium hydroxide solution, are added to 1 g of viscose fiber pre-swollen in 25 ml of water. The reaction mixture is stirred at 60° C. for 2.5 hours. The fibrous product is filtered off and then washed and dried as described in Example 1. 1 g of the dry end product is obtained with a cyclodextrin content of 5%.

EXAMPLE 11

0.5 g of a fibrous product prepared as described in Example 8, containing 18.7% of β-cyclodextrin, are pre-swollen in water and then filled into a chromatographic column 1.4 cm in diameter. Water saturated with benzene (benzene content: 0.7 mg/ml) is passed through the column at a rate of 1 ml/min., and the benzene content of the effluent is measured. Calculated from the measured values, the ratio of benzene bound on the column to the β-cyclodextrin content is 0.15:1. Benzene can be recovered without any loss by heat treatment, and in this way the column packing can be regenerated as well.

EXAMPLE 12

A column for removing benzene from its dilute aqueous solution is prepared as described in Example 11 with the difference that the fibrous material prepared as described in Example 6, containing 50% of γ-cyclodextrin, is applied as packing. The molar ratio of benzene bound on the column to γ-cyclodextrin is 0.14:1.

EXAMPLE 13

A column is prepared from 0.5 g of the fibrous material prepared as described in Example 9, containing 29.6 % of β-cyclodextrin, according to the method of Example 11, and a 20 mg/ml aqueous solution of phenol is passed through the column at a rate of 1 ml/min. The molar ratio of phenol bound on the column to β-cyclodextrin is 4:1.

EXAMPLE 14

A column is prepared from 0.5 g of the fibrous material prepared as described in Example 5, containing 41% of α-cyclodextrin, according to the method of Example 11, and a 1 mg/ml aqueous solution of phenol is passed through the column at a rate of 1 ml/min. The molar ratio of phenol bound on the column to α-cyclodextrin is 0.2:1. Phenol can be recovered, and thus the packing can be regenerated, by heating or upon eluting it with alcohol.

EXAMPLE 15

A column is prepared from 0.5 g of the fibrous material prepared as described in Example 8, containing 18.7% of β-cyclodextrin, according to the method of Example 11, and a 1 mg/ml aqueous solution of p-cresol is passed through the column at a rate of 1 ml/min. The molar ratio of p-cresol bound on the column to β-cyclodextrin is 0.25:1.

EXAMPLE 16

The chromatographic column described in Example 15 is utilized to remove p-cresol from its dilute (18 mg/ml) aqueous solution. The molar ratio of p-cresol bound on the column to β-cyclodextrin is 1.6:1.

EXAMPLE 17 p-Cresol is removed from its dilute (1 mg/ml) aqueous solution as described in Example 13 with the difference that 0.5 g of the material prepared according to Example 6, containing 50% of γ-cyclodextrin, are applied as packing. The molar ratio of p-cresol bound on the column to γ-cyclodextrin is 0.4:1.

EXAMPLE 18

Cylindrical smoke filters, 0.8×1.6 cm in dimensions, are prepared from a fibrous material containing 50% of γ-cyclodextrin, and the filters are fitted to "Symphonia" cigarettes produced in the Tobacco Factory of Eger, Hungary. The effectivity of the cyclodextrin-containing filter is tested according to the prescriptions of the Hungarian Standard No. 20519-73. One filter insert binds 6 mg of tar and 2.8 mg of nicotine in average, thus the filtering effectivity is 55% for tar and 90% for nicotine.

EXAMPLE 19

One proceeds as described in Example 18 with the difference that the product prepared according to Example 1, containing 48% by weight of β-cyclodextrin, is used as sorbent material.

One filter insert binds 6 mg of tar and 1.1 mg of nicotine in average, thus the filtering efficiency is 55% for tar and 35% for nicotine.

What we claim is:

1. A cellulose derivative containing structural units of the formula (I),

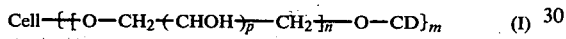

wherein
Cell is a group derived by removing m hydroxy groups from the glucose unit of the cellulose chain,
m is an integer of 1 to 3,
CD is a group derived by removing one hydroxy group from the α, β or γ-cyclodextrin molecule,
n is an integer of 1 to 5, and
p stands for 0 or 1 and can vary even within a single chain.

2. A cellulose derivative as claimed in claim 1, wherein CD is a group derived by removing one hydroxy group from the α-cyclodextrin molecule.

3. A cellulose derivative as claimed in claim 1, wherein CD is a group derived by removing one hydroxy group from the β-cyclodextrin molecule.

4. A cellulose derivatives as claimed in claim 1, wherein DC is a group derived by removing one hydroxy group from the γ-cyclodextrin molecule.

5. A cellulose derivative as defined in claim 1, wherein CD stands for a group derived by removing one hydroxy group from an α, β or γ-cyclodextrin molecule.

6. A sorption element comprising a cellulose derivative as defined in claim 1.

7. A process for the preparation of a cellulose derivative containing structural units of the formula (I),

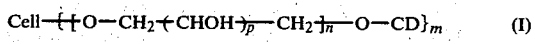

wherein
Cell is a group derived by removing m hydroxy groups from the glucose unit of the cellulose chain,
m is an integer of 1 to 3,
CD is a group derived by removing one hydroxy group from an α, β or γ-cyclodextrin molecule,
n is an integer of 1 to 5, and
p stands for 0 or 1 and can vary even within a single chain, comprising the steps of
(a) reacting one part by weight of cellulose, regenerated cellulose or other cellulose-containing fibrous material preswollen in water with 5 to 30 parts by weight of epichlorohydrin or 1,2-bis(2,3-epoxypropoxy)-ethane in the presence of 10 to 65 parts by weight of water and 1.5 to 5 parts by weight of an alkali metal or alkaline earth metal hydroxide, and the resulting solid product is reacted with 1 to 2 parts by weight of a cyclodextrin in the presence of 1 to 40 parts by weight of an alkali metal or alkaline earth metal hydroxide and 10 to 100 parts by weight of water; or
(b) reacting 1 part by weight of cellulose, regenerated cellulose or other cellulose-containing fibrous material preswollen in water and 1 to 2 parts by weight of a cyclodextrin with 15 to 40 parts by weight of epichlorohydrin or 1,2-bis(2,3-epoxypropoxy)-ethane in the presence of 40 to 65 parts by weight of water and 10 to 30 parts by weight of an alkali metal or alkaline earth metal hydroxide.

8. A process as defined in claim 7 wherein the reaction is performed at a temperature of 40° to 80° C.

9. A process as defined in claim 7 wherein α-cyclodextrin is used as the cyclodextrin.

10. A process as defined in claim 7 wherein β-cyclodextrin is used as the cyclodextrin.

11. A process as defined in claim 7 wherein γ-cyclodextrin is used as the cyclodextrin.

12. A process as defined in claim 7 wherein viscose fibers are used as the cellulose-containing fibrous material.

13. A process as defined in claim 7 wherein shredded tissue paper is used as the cellulose-containing fibrous material.

14. A process as defined in claim 7 wherein ground oak bark is used as the cellulose-containing fibrous material.

15. A process as defined in claim 7 wherein granular cellulose is used as the cellulosic material.

* * * * *